(12) United States Patent
Camarda et al.

(10) Patent No.: US 8,002,219 B2
(45) Date of Patent: Aug. 23, 2011

(54) MULTI-FUNCTIONAL ANNULAR FAIRING FOR COUPLING LAUNCH ABORT MOTOR TO SPACE VEHICLE

(75) Inventors: Charles J. Camarda, League City, TX (US); Stephen J. Scotti, Grafton, VA (US); Pieter G. Buning, Yorktown, VA (US); Steven X. S. Bauer, Yorktown, VA (US); Walter C. Engelund, Seaford, VA (US); David M. Schuster, Williamsburg, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 792 days.

(21) Appl. No.: 11/941,119

(22) Filed: Nov. 16, 2007

(65) Prior Publication Data
US 2008/0265099 A1    Oct. 30, 2008

Related U.S. Application Data

(60) Provisional application No. 60/866,260, filed on Nov. 17, 2006.

(51) Int. Cl.
*B64G 1/40* (2006.01)
(52) U.S. Cl. .................................................. 244/171.3
(58) Field of Classification Search ............... 244/3.22, 244/3.21, 158.1, 171.1, 3.24, 164, 173.1, 244/171.7, 171.3
See application file for complete search history.

(56) References Cited

U.S. PATENT DOCUMENTS

| | | | |
|---|---|---|---|
| 3,057,581 A * | 10/1962 | Tumavicus | 244/52 |
| 4,681,283 A * | 7/1987 | Kranz | 244/3.22 |
| 4,776,539 A | 10/1988 | Byers et al. | |
| 5,141,181 A | 8/1992 | Leonard | |
| 5,143,327 A | 9/1992 | Martin | |
| 5,203,844 A | 4/1993 | Leonard | |
| 5,350,137 A * | 9/1994 | Henley | 244/158.1 |
| 5,433,402 A * | 7/1995 | Surauer et al. | 244/164 |
| 5,439,188 A * | 8/1995 | Depew et al. | 244/3.21 |
| 5,456,425 A * | 10/1995 | Morris et al. | 244/3.22 |
| 5,529,264 A | 6/1996 | Bedegrew et al. | |
| 5,743,492 A | 4/1998 | Chan et al. | |
| 6,213,430 B1 | 4/2001 | Spandorf | |
| 6,416,018 B2 | 7/2002 | DiVerde et al. | |
| 6,513,760 B1 | 2/2003 | Mueller et al. | |
| 6,568,639 B2 | 5/2003 | Carpenter et al. | |
| 6,666,409 B2 | 12/2003 | Carpenter et al. | |
| 6,739,555 B2 | 5/2004 | Mazanek et al. | |
| 6,845,949 B2 | 1/2005 | Blackwell-Thompson et al. | |
| 7,093,805 B2 | 8/2006 | Blackwell-Thompson et al. | |
| 7,114,682 B1 | 10/2006 | Kistler et al. | |
| 7,118,077 B1 | 10/2006 | Kistler et al. | |
| 7,156,348 B1 | 1/2007 | Kistler et al. | |
| 7,198,233 B1 | 4/2007 | Mueller et al. | |
| 7,204,460 B2 | 4/2007 | Bigelow | |

(Continued)

*Primary Examiner* — Tien Dinh
(74) *Attorney, Agent, or Firm* — Andrea Z. Warmbier; Robin W. Edwards (57) ABSTRACT

An annular fairing having aerodynamic, thermal, structural and acoustic attributes couples a launch abort motor to a space vehicle having a payload of concern mounted on top of a rocket propulsion system. A first end of the annular fairing is fixedly attached to the launch abort motor while a second end of the annular fairing is attached in a releasable fashion to an aft region of the payload. The annular fairing increases in diameter between its first and second ends.

20 Claims, 6 Drawing Sheets

U.S. PATENT DOCUMENTS

| | | | |
|---|---|---|---|
| 2002/0000495 A1* | 1/2002 | Diverde et al. | 244/137.1 |
| 2005/0116088 A1* | 6/2005 | Telford et al. | 244/10 |
| 2007/0012821 A1 | 1/2007 | Buehler | |
| 2007/0063107 A1* | 3/2007 | Mueller et al. | 244/173.1 |

* cited by examiner

MULTI-FUNCTIONAL ANNULAR FAIRING FOR COUPLING LAUNCH ABORT MOTOR TO SPACE VEHICLE

CROSS-REFERENCE TO RELATED APPLICATIONS

Pursuant to 35 U.S.C. §119, the benefit of priority from U.S. provisional application 60/866,260, with a filing date of Nov. 17, 2006, now abandoned, is claimed for this non-provisional application.

STATEMENT REGARDING FEDERALLY SPONSORED RESEARCH OR DEVELOPMENT

This invention was made by employees of the United States Government and may be manufactured and used by or for the Government of the United States of America for governmental purposes without the payment of any royalties thereon or therefore.

BACKGROUND OF THE INVENTION

1. Field of the Invention

This invention relates to launch abort systems for space vehicles. More specifically, the invention is a multi-functional, annular fairing that couples a launch abort motor to a space vehicle in order to efficiently transfer launch inertial loads; to protect the space vehicle from induced environments and external threats such as impacts, pressure, acoustic and thermal loads; and to provide an efficient aerodynamic shape to the space vehicle and the abort configuration.

2. Description of the Related Art

Launch abort systems are incorporated into space launch systems when there is a high-value payload module (e.g., manned module, high-value hardware, radioactive or toxic payload, etc.) mounted atop a rocket propulsion system. The typical launch abort system includes a solid-surface or open framework vertical tower mounted on top of the payload. That is, the payload must support weight of the tower/launch abort system as well as bending loads generated by the tower/launch abort system. The vertical tower supports a solid fuel launch abort motor and exhaust nozzles that are canted at some angle relative to the motor's centerline. The angle is selected to optimize launch abort thrust, while accounting for impulse load requirements as well as plume aero-heating impingement effects. Once a good/nominal launch (provided by the main rocket propulsion system) has been achieved, the launch abort system is jettisoned with the launch abort motor remaining unused. The mass/inertial, acoustic and drag loads produced by prior art, tower-type launch abort systems are considerable and must be accounted for when designing the main rocket propulsion system even though the launch abort system will never make the journey into space.

SUMMARY OF THE INVENTION

Accordingly, it is an object of the present invention to efficiently couple a launch abort system to a space vehicle.

Another object of the present invention is to provide an apparatus/system for coupling a launch abort system to rocket-propelled space vehicle to minimize the weight and drag effects of the launch abort system on the space vehicle.

Yet another object of the present invention is to protect a space vehicle from induced environments and external threats such as impacts, pressure, acoustic and thermal loads.

Other objects and advantages of the present invention will become more obvious hereinafter in the specification and drawings.

In accordance with the present invention, an annular fairing couples a launch abort motor to a space vehicle having a payload of concern mounted on top of a rocket propulsion system. The annular fairing has aerodynamic, structural, thermal and acoustic attributes. A first end of the annular fairing is fixedly attached to a portion of the launch abort motor while a second end of the annular fairing is attached in a releasable fashion to an aft region of the payload of concern. The annular fairing increases in diameter between its first end and second end. In one embodiment, the launch abort motor includes exhaust nozzles, and the first end of the annular fairing is positioned aft of the exhaust nozzles.

DETAILED DESCRIPTION OF THE INVENTION

Figure 1:
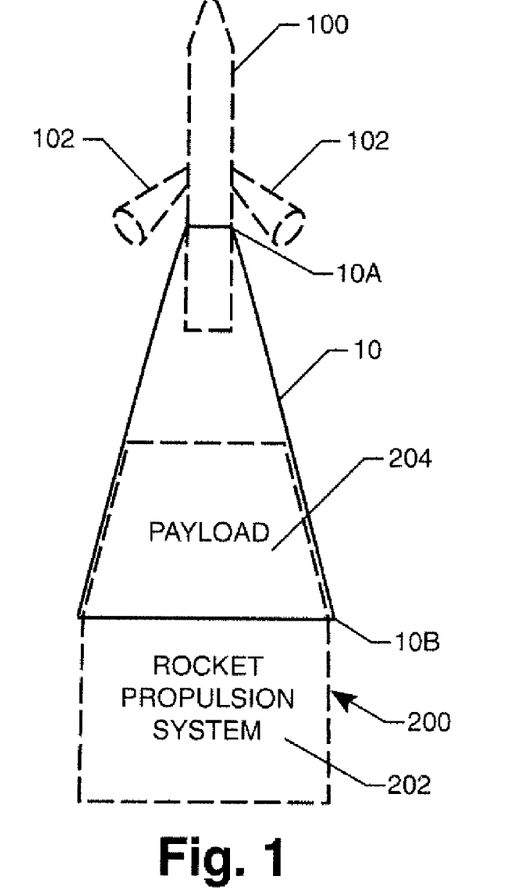
FIG. 1 is a schematic view of an annular fairing used to couple a launch abort system to a space vehicle in accordance with the present invention.

Referring now to the drawings and more particularly to FIG. 1, an annular fairing in accordance with the present invention is illustrated and is referenced by numeral 10. In general, annular fairing 10 couples a launch abort motor 100 to a space vehicle 200, both of which are illustrated in dashed-line form to indicate that they do not form part of the present invention.

Space vehicle 200 is defined by a rocket propulsion system 202 and a payload 204 mounted on top of rocket propulsion system 202. Payload 204 can be a manned module, hardware that is to be transported in space for use or deployment therein, or a manned module coupled to a service module. Rocket propulsion system 202 is any single or multi-stage rocket that will be used to transport payload 202 into space. Further, in some embodiments rocket propulsion system 202 can include a single or multistage rocket plus an orbital service module that does not need to be saved during an emergency abort. Typically, rocket propulsion system 202 is jettisoned from payload 204 once payload 204 has been launched into space for its point-to-point or orbiting journey. It is to be understood that the particular construction details and/or nature of space vehicle 200 are not limitations of the present invention.

As would be understood in the art, launch abort motor 100 is the "engine" of a launch abort system (to include sensors, processors, mechanisms, etc.) designed to safely transport some or all of payload 204 away from propulsion system 202 in the event of a launch problem. Typically, launch abort motor 100 will include exhaust nozzles 102 canted away from the centerline of launch abort motor 100. It is to be understood that the particular construction details of launch abort motor 100 and exhaust nozzles 102 are not limitations of the present invention. Fairing 10 is an annular solid surface structure that is structurally coupled in a fixed fashion to launch abort motor 100 (aft of exhaust nozzles 102) while being attached in a releasable fashion to space vehicle 200. In this way, once a successful launch has been achieved, annular fairing 10 and launch abort motor 100 can be jettisoned as a single assembly from space vehicle 200. In addition and as will be explained further below, the multi-functional attributes provided by annular fairing 10 permit launch abort motor 100 to be operated while fairing 10 remains attached to payload 204. In this way, once a successful launch has been achieved, launch abort motor 100 can be fired while remaining attached to payload 204 to provide additional boost power prior to being jettisoned along with annular fairing 10.

As mentioned above, annular fairing 10 is attached to payload 204 in a releasable fashion such that annular fairing 10 can be detached from payload 204 when being jettisoned with launch abort motor 100 as described above. However, in the event of a launch problem, payload 204 is released from rocket propulsion system 202 while annular fairing 10 remains attached to payload 204 as launch abort motor 100 is fired. In contrast with the prior art, annular fairing 10 attaches to payload 204 at an aft region thereof where the portion of payload 204 that is forward of such attachment is considered to be the payload of interest that is to be saved in the event of a launch problem. For example, annular fairing 10 could be coupled to the aft portion of a manned module, the aft portion of a hardware module, or anywhere on payload 204 such that the payload of interest remains within the confines of annular fairing 10 during a launch or if a launch abort event occurs.

In accordance with the present invention, annular fairing 10 provides a number of functions beyond its use as the means to couple launch abort motor 100 to space vehicle 200. These functions include, but are not limited to the following:

optimizing the aerodynamic air flow to thereby reduce drag and acoustic loads;

thermal protection and insulation from launch and plume loads;

structural integrity; and acoustic insulation/attenuation.

The multi-functional capability of annular fairing 10 is advancement over prior art systems that couple a launch abort motor to a space vehicle.

With respect to optimizing the aerodynamic air flow, annular fairing 10 gradually increases in outer diameter from its end 10A coupled to motor 100 to its end 10B coupled to the aft region of payload 204. This gradual increase can be governed by a linear function (as in the illustrated example where annular fairing 10 is conical) or by a non-linear function as will be explained further below. The outer surface of annular fairing 10 can be smooth or textured (e.g., ribbed, dimpled, etc.) to enhance aerodynamic flow as deemed appropriate without departing from the scope of the present invention.

Figure 2:
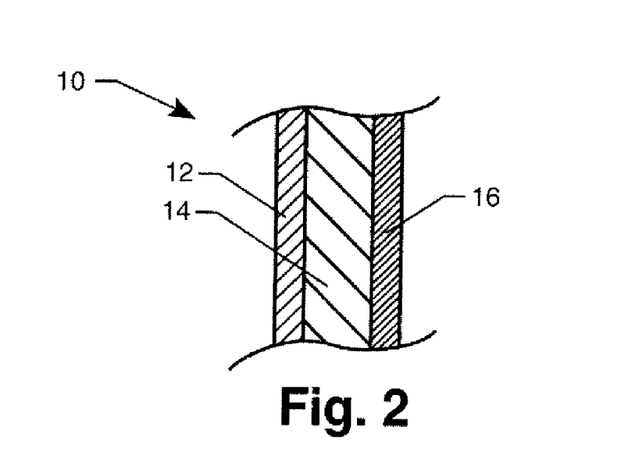
FIG. 2 is a cross-sectional schematic view of an annular fairing having a multi-layer structure in accordance with an embodiment of the present invention.

With the respect to the thermal protection and insulation, structural integrity, and acoustic insulation functions of annular fairing 10, a variety of constructions are possible. For example, as shown in the cross-sectional schematic view of annular fairing 10 in FIG. 2, a multi-layer structure could be used to define the thickness of fairing 10. An outer layer 12 could comprise one or more materials that provide thermal protection and insulation. An intermediate layer 14 could comprise one or more materials that provide structural strength. Annular and or vertical strength members (not shown) could also be incorporated in intermediate layer 14. An inner layer 16 could comprise one or more materials that provide acoustic insulation for the portion of the payload maintained within the confines of annular fairing 10. It is to be understood that a particular layer is not limited to satisfying a single function. That is, outer layer 12 could be constructed to provide strength and acoustic insulation in addition to thermal protection and insulation. Similarly, intermediate layer 14 could be constructed to also provide additional thermal protection/insulation and acoustic insulation, while inner layer 16 could also provide additional strength and thermal protection/insulation. Still further, annular fairing 10 could comprise a single layer composite material providing all of the above functions.

Figure 3:
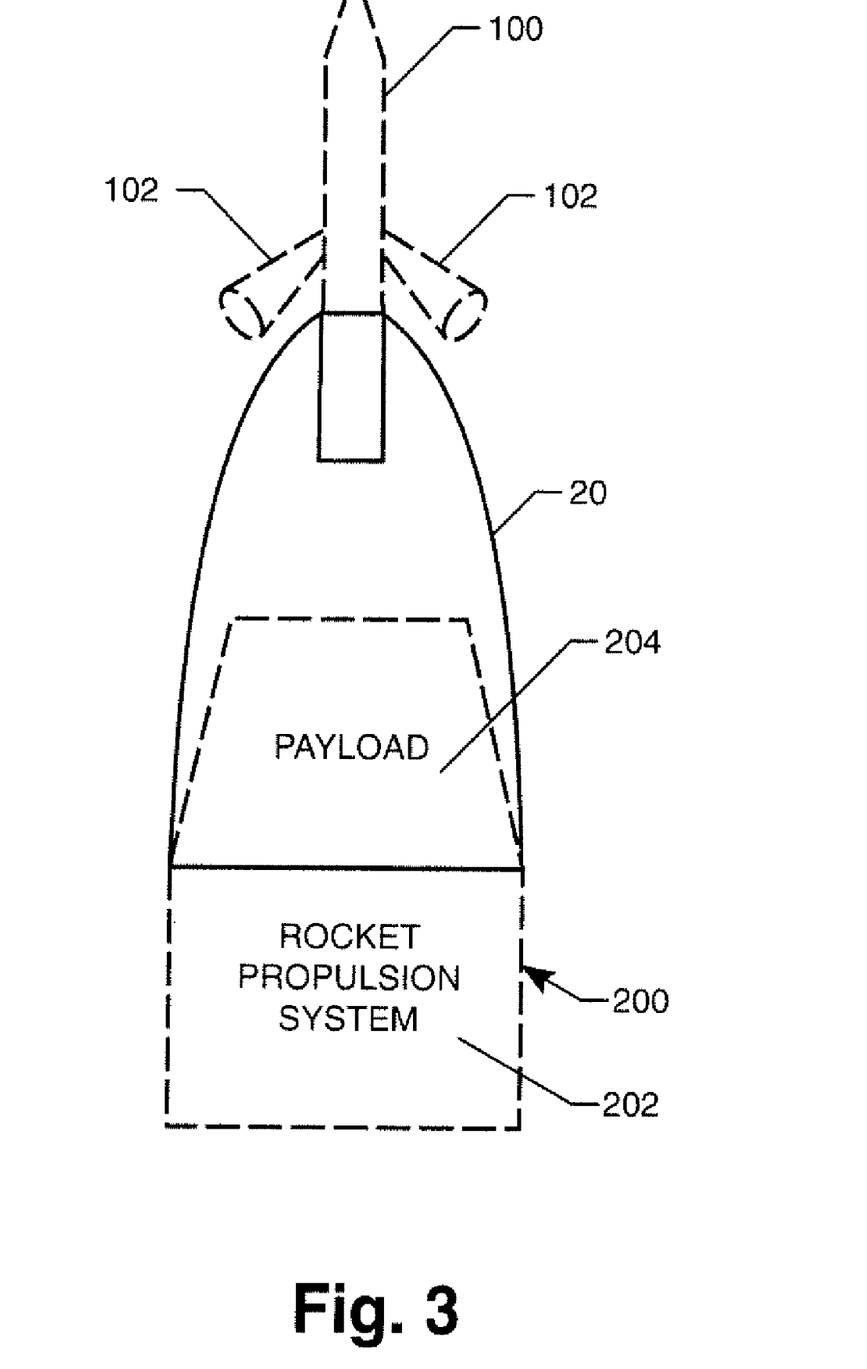
FIG. 3 is a schematic view of an annular fairing shape in accordance with another embodiment of the present invention.

The outer shape of annular fairing 10 can be defined by a linear function that gradually increases in diameter as shown in FIG. 1. However, the outer shape could also be governed by a non-linear function to satisfy aerodynamic, strength and/or acoustic criteria. For example, as shown in FIG. 3, an annular fairing 20 is "bullet" shaped. Other possible shapes include the Sears-Haack aerodynamic nose and Von Karman ogive. Accordingly, it is to be understood that the particular increasing-diameter, aerodynamic shape of the annular fairing is not a limitation of the present invention.

Figure 4:
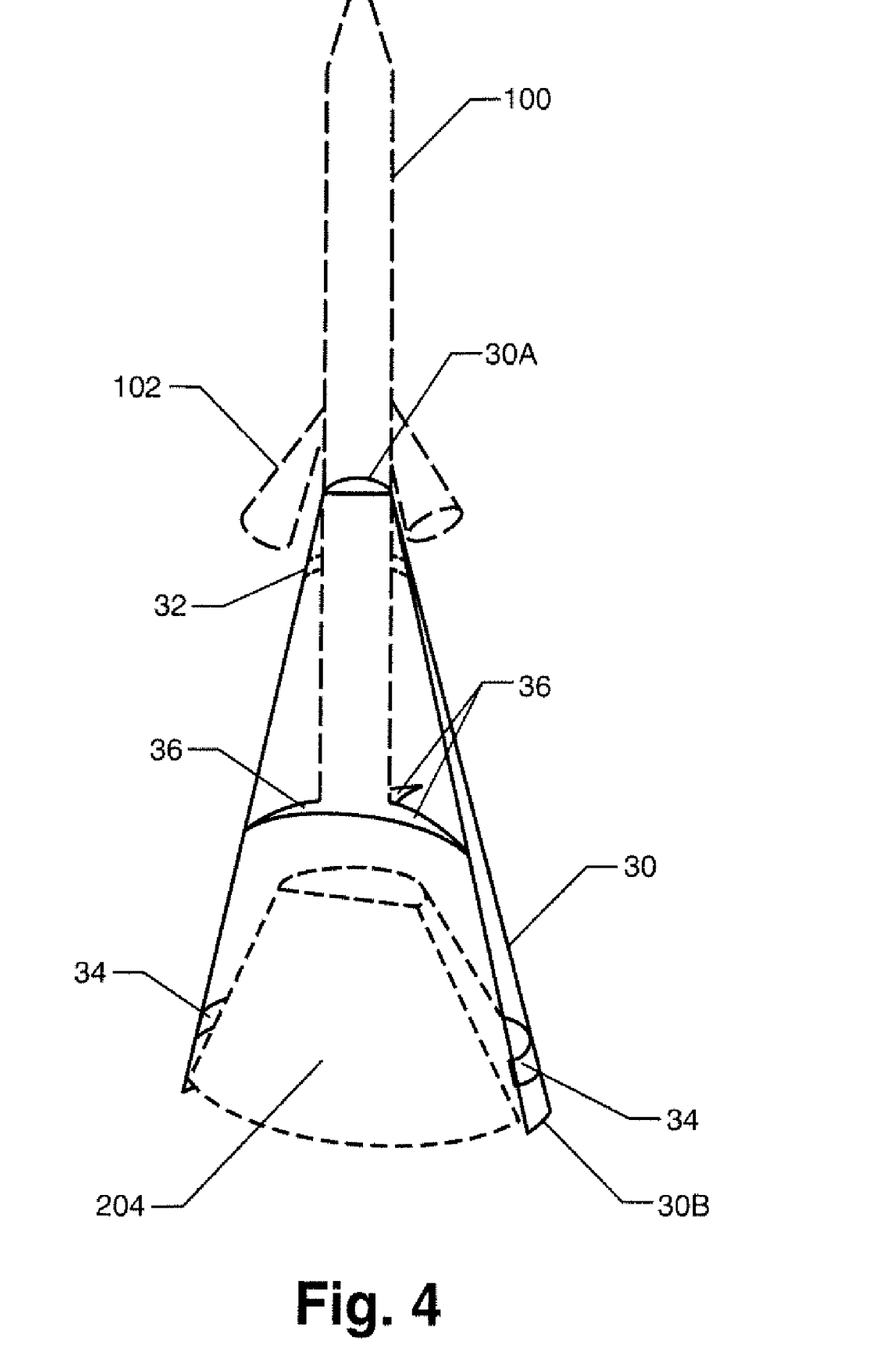
FIG. 4 is a cut-away view of an annular fairing in accordance with an embodiment of the present invention.
Figure 5:
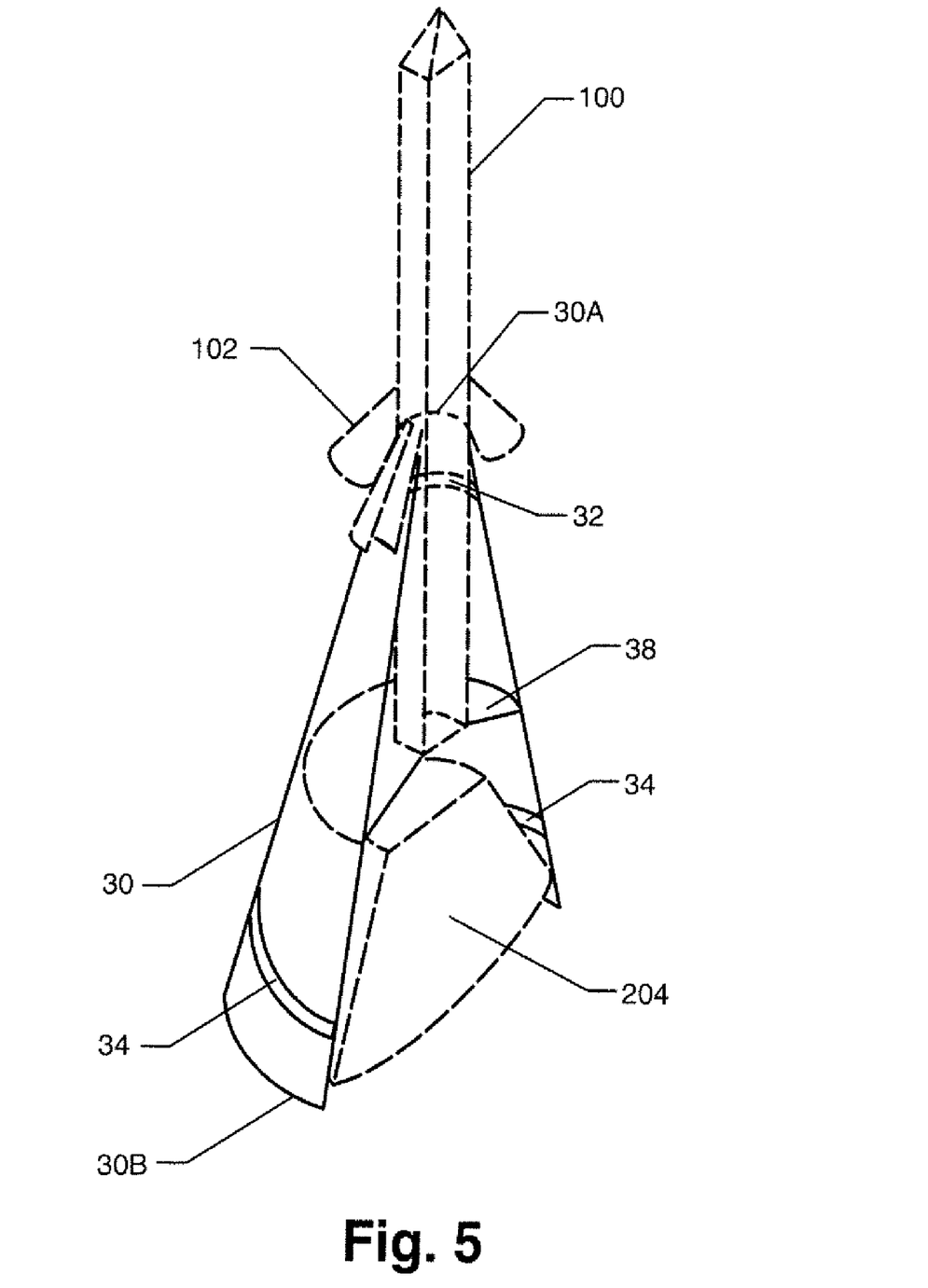
FIG. 5 is a cut-away view of an annular fairing in accordance with another embodiment of the present invention.

Referring now to FIG. 4, a cut-away view of a specific annular fairing 30 is illustrated. Annular fairing 30 incorporates rings 32 and 34 near ends 30A and 30B, respectively, to increase the annular stiffness of fairing 30 where it attaches to motor 100 and the aft region of payload 204. A plurality of arms 36 rigidly couple motor 100 to fairing 30 within the confines thereof in order to transfer off-axis loads from motor 100 into fairing 30. In this way, off-axis loads from motor 100 are distributed into fairing 30 and then on to the aft region of payload 204 that is typically designed (e.g., with structural buttresses) to handle large loads (e.g., launch loads and re-entry loads). The location of arms 36 is not limited to the aft end of motor 100 as illustrated. Further, additional sets of such arms could also be used, or the design may not incorporate any structural connection between the motor and the annular fairing but the one indicated at end 30A. Still further, as shown in FIG. 5, a conical bulkhead 38 could be used in place of arms 36 to transfer off-axis loads to fairing 30.

Figure 6:
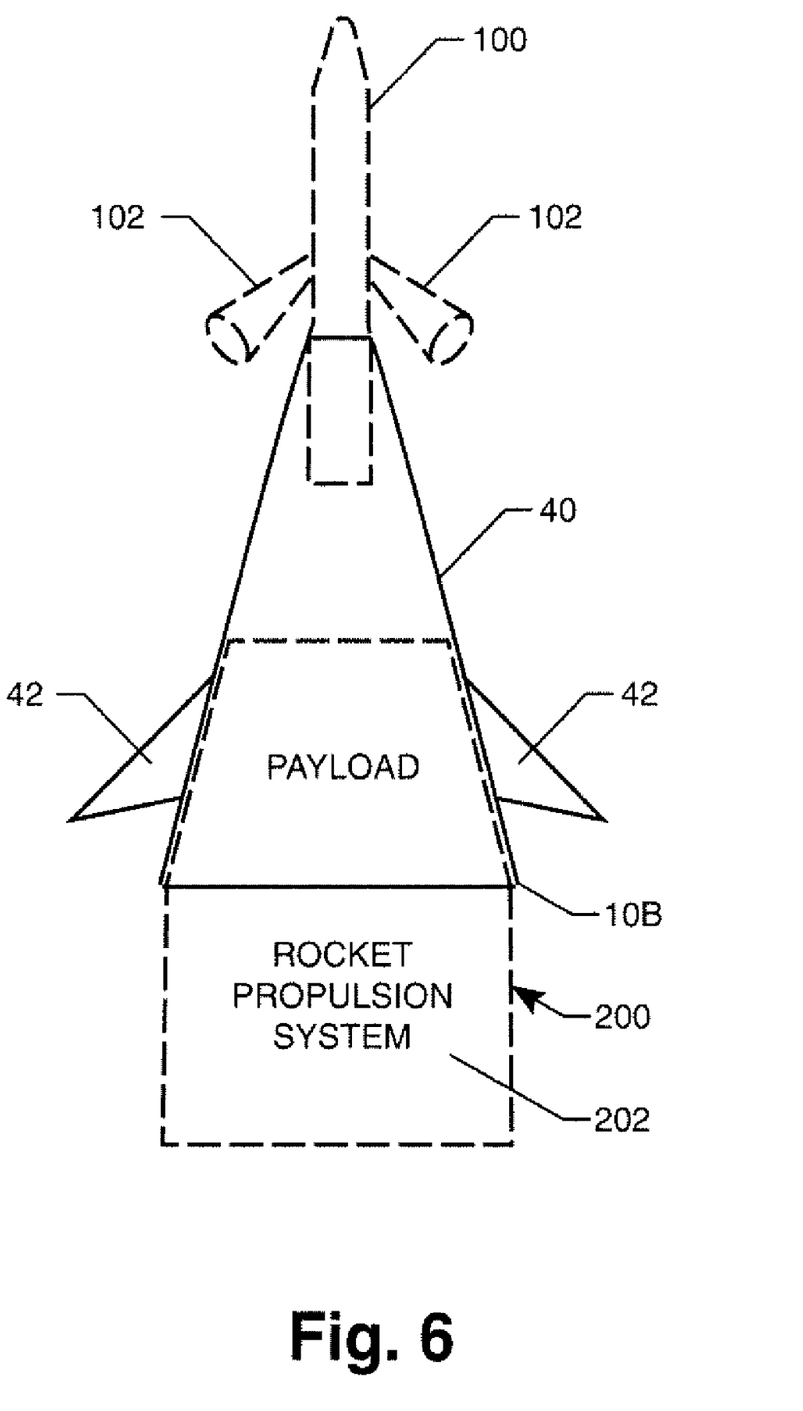
FIG. 6 is a side-view of an annular fairing further equipped with aerodynamics control surfaces.

Referring now to FIG. 6, another annular fairing 40 in accordance with the present invention has control surfaces 42 mounted thereon to improve the aerodynamic characteristics of the fairing before, during and after abort (i.e., to improve the controllability/stability of the entire launch stack or only that of the abort system). Control surfaces 42 can be fixed or movable without departing from the scope of the present invention. Further, the number and particular shape of control surfaces 42 are not limitations on the present invention.

The advantages of the present invention are numerous. The multi-functional annular fairing provides for efficient aerodynamic, aerothermal, structural, and acoustic coupling of a launch abort motor to a space vehicle's payload of interest. This new design minimizes mass effects on the payload by transferring a launch abort system's loads directly to the aft region of the payload along an efficient load-transfer path. These loads are efficiently transferred into the aft region of the payload that is typically designed to handle launch, re-entry, and landing loads to thereby take advantage of the inherent design features of the vehicle. Thus, once a successful/nominal launch has been achieved, the launch abort motor can be fired simply to provide additional thrust (prior to jettison) thereby increasing the space vehicle's payload capacity. The increasing-diameter aerodynamic shape of the fairing improves air flow during a space vehicle's launch to minimize drag and reduce the acoustic signature associated therewith. Annular stiffening and/or internal off-axis load transfer is readily accommodated, resulting in a naturally stiffer configuration than a long narrow cylindrical "tower rocket" configuration. The annular fairing further provides additional structural, thermal, acoustic, and foreign-object-damage (e.g., hail stones, bird strikes, etc.) protection for the payload of interest during space vehicle launch.

Figure 7:
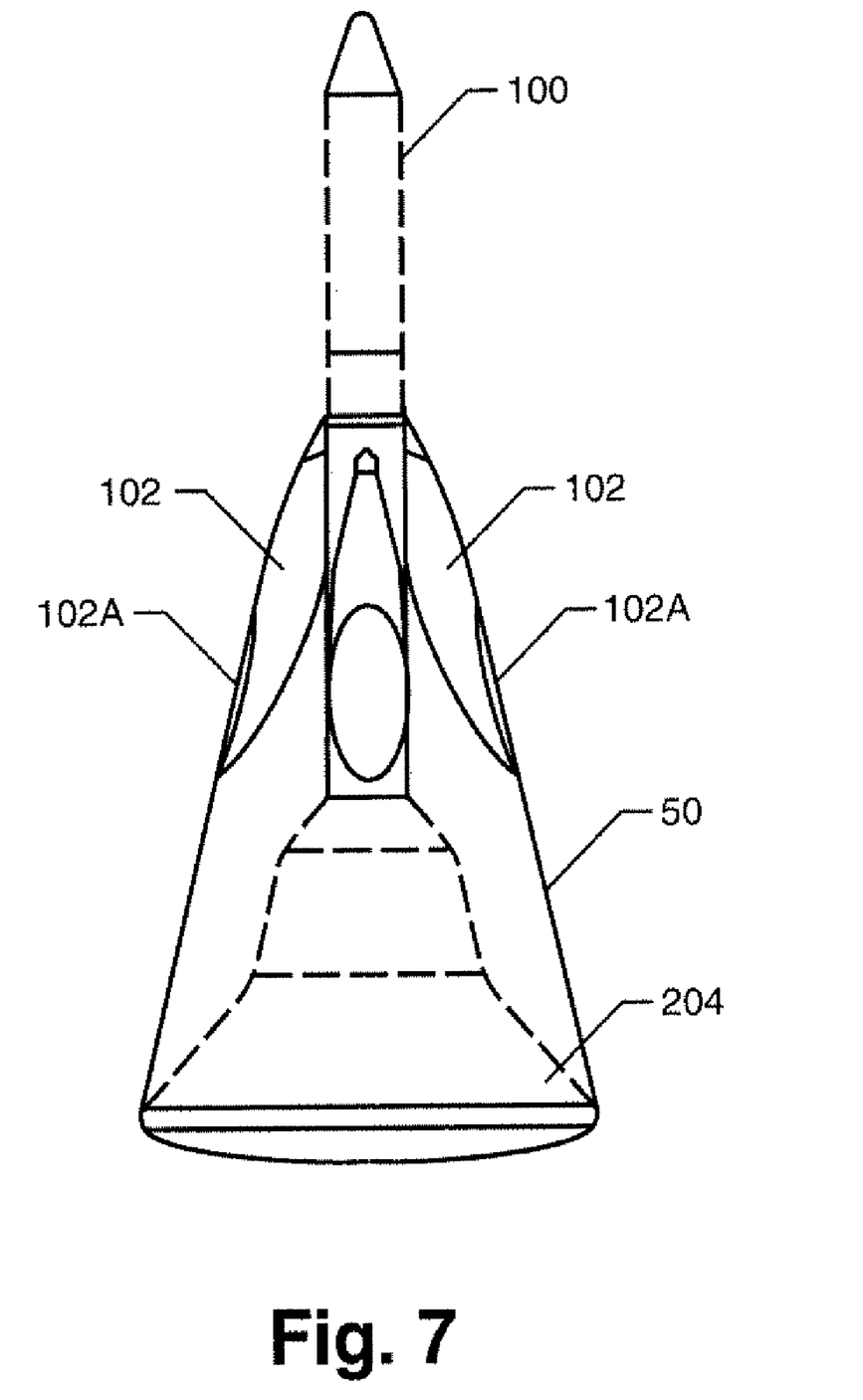
FIG. 7 is a side view of an annular fairing in accordance with another embodiment of the present invention in which the abort motor's exhaust nozzles are incorporated/integrated into the annular fairing.

Although the invention has been described relative to a specific embodiment thereof, there are numerous variations and modifications that will be readily apparent to those skilled in the art in light of the above teachings. For example, FIG. 7 illustrates another embodiment of the present invention where annular fairing 50 incorporates/integrates exhaust nozzles 102 therein with exhaust nozzle exits 102A being ported through annular fairing 50. It is therefore to be understood that, within the scope of the appended claims, the invention may be practiced other than as specifically described.

The invention claimed is:

1. An apparatus, comprising:
an annular fairing having a first end and a second end;
a payload of concern mounted on top of a rocket propulsion system, the payload of concern having an aft region, wherein the payload of concern is confined within the annular fairing;
a launch abort motor, wherein the first end is fixedly attached to the launch abort motor and the second end is attached in a releasable fashion to the aft region of the payload of concern, said annular fairing increasing in diameter from said first end to said second end.

2. An apparatus as in claim 1 wherein the launch abort motor includes exhaust nozzles, and wherein said first end of said annular fairing is positioned aft of the exhaust nozzles.

3. An apparatus as in claim 2, wherein the launch abort motor includes exhaust nozzles, and wherein the exhaust nozzles are confined within the annular fairing.

4. An apparatus as in claim 1 wherein said annular fairing increases in said diameter in accordance with a linear function.

5. An apparatus as in claim 1 wherein said annular fairing increases in said diameter in accordance with a non-linear function.

6. An apparatus as in claim 1 wherein said annular fairing includes means for stiffening said annular fairing at said first end and at said second end thereof.

7. An apparatus as in claim 1 further comprising means, adapted to be coupled to the launch abort motor and said annular fairing between said first and second ends thereof, for transferring off-axis loads generated by the launch abort motor to said annular fairing.

8. An apparatus as in claim 1 wherein a thickness of said annular fairing is defined by multiple layers.

9. An apparatus as in claim 8 wherein each of said multiple layers comprises at least one material having properties that contribute to at least one of said thermal, structural and acoustic attributes.

10. An apparatus as in claim 1 further comprising aerodynamic control surfaces coupled to said annular fairing.

11. An apparatus for coupling a launch abort motor to a space vehicle having a payload of concern mounted on top of a rocket propulsion system, comprising:
an annular fairing having aerodynamic, thermal, structural and acoustic attributes, said annular fairing having a first end adapted to be fixedly attached to a portion of the launch abort motor and having a second end adapted to be attached in a releasable fashion to an aft region of the payload of concern, said annular fairing increasing in diameter between said first end and said second end thereof in accordance with a non-linear function, wherein the payload of concern is confined within the annular fairing; and
an off-axis load transfer adapted to be coupled to the launch abort motor and said annular fairing between said first and second ends thereof, for transferring off-axis loads generated by the launch abort motor to said annular fairing.

12. An apparatus as in claim 11 wherein the launch abort motor includes exhaust nozzles, and wherein said first end of said annular fairing is positioned aft of the exhaust nozzles.

13. An apparatus as in claim 11 wherein said annular fairing includes annular stiffening for stiffening said annular fairing at said first end and at said second end thereof.

14. An apparatus as in claim 11 wherein a thickness of said annular fairing is defined by multiple layers.

15. An apparatus as in claim 11, wherein the off-axis load transfer comprises a plurality of arms.

16. An apparatus as in claim 11 further comprising aerodynamic control surfaces coupled to said annular fairing.

17. An apparatus for coupling a launch abort motor to a space vehicle having a payload of concern mounted on top of a rocket propulsion system, comprising:
a multiple-layer annular fairing having aerodynamic, thermal, structural and acoustic attributes, said multiple-layer annular fairing having a first end adapted to be fixedly attached to a portion of the launch abort motor and having a second end adapted to be attached in a releasable fashion to an aft region of the payload of concern, wherein the payload of concern is confined within the annular fairing, said multiple-layer annular fairing increasing in diameter between said first end and said second end thereof in accordance with a non-linear function, each layer of said multiple-layer annular fairing comprising at least one material having properties that contribute to at least one of said thermal, structural and acoustic attributes.

18. An apparatus as in claim 17 wherein the launch abort motor includes exhaust nozzles, and wherein said first end of said multiple-layer annular fairing is positioned aft of the exhaust nozzles.

19. An apparatus as in claim 17 wherein said multiple-layer annular fairing includes an annular stiffening for stiffening said multiple-layer annular fairing at said first end and at said second end thereof.

20. An apparatus as in claim 17 further comprising aerodynamic control surfaces coupled to said multiple-layer annular fairing.

* * * * *